United States Patent [19]

Gullman

[11] Patent Number: 5,111,004
[45] Date of Patent: May 5, 1992

[54] STYLUS FOR HANDWRITING IDENTIFICATION

[75] Inventor: Larry S. Gullman, La Honda, Calif.

[73] Assignee: Kumahira Safe Co., Inc., Hiroshima, Japan

[21] Appl. No.: 704,761

[22] Filed: May 23, 1991

[51] Int. Cl.⁵ .............................................. G08C 21/00
[52] U.S. Cl. .................................. 178/18; 73/862.68; 382/3
[58] Field of Search .......................... 178/18, 19, 87; 73/862.04, 862.68; 382/59, 3

[56] References Cited

U.S. PATENT DOCUMENTS

| | | |
|---|---|---|
| Re. 29,765 | 9/1978 | Crane et al. . |
| 3,891,555 | 6/1975 | Bennett et al. . |
| 3,906,444 | 9/1975 | Crane et al. . |
| 3,986,403 | 10/1976 | Hurd et al. . |
| 4,078,226 | 3/1978 | EerNisse et al. . |
| 4,111,052 | 9/1978 | Sniderman . |
| 4,513,437 | 4/1985 | Chainer et al. . |
| 4,646,351 | 2/1987 | Asbo et al. . |
| 4,786,764 | 11/1988 | Padula et al. ........................ 178/18 |
| 4,793,193 | 12/1988 | Borgudd . |
| 4,896,543 | 1/1990 | Gullman . |

FOREIGN PATENT DOCUMENTS 2162982A 7/1985 United Kingdom .

OTHER PUBLICATIONS

The abstract of an article by De Bruyne and Messmer.
The abstract of an article by Yonezawa.

Primary Examiner—Stafford D. Schreyer
Attorney, Agent, or Firm—Townsend and Townsend

[57] ABSTRACT

A stylus formed of a shaft containing pressure sensors and useful in signature verification and in identification of individuals. The pressure sensors are imbedded in and integral with the shaft of the stylus at a predetermined distance from the tip used for writing. The sensors are preferably disposed in an annulus and located in each of four quadrants surrounding the shaft enabling three-axis pressure detection.

8 Claims, 1 Drawing Sheet

SECTION A-A

STYLUS FOR HANDWRITING IDENTIFICATION

BACKGROUND OF THE INVENTION

The present invention relates to signature recognition devices and in particular to a writing stylus sensitive to writing pressure.

Various devices exist for verifying a person's identity through indicia unique to that individual. Common indicia include fingerprints, voice graphs, retina scans and signature verification. Comparison of a sample signature with a reference, or valid, signature is a practical and efficient method of identity verification. Each individual signature has characteristics unique to that signature. These characteristics can be measured and used to discern a forged signature from a genuine signature.

Measurable signature characteristics include pen pressure as a function of a dynamic such as time, pen direction and pen velocity. Of these characteristics, pen pressure is the most commonly measured characteristic. Pressure can be detected either on the writing surface or on the writing tool itself. Measuring the pressure on the writing tool proves to be the more convenient of these two choices, since instrumentation need not be provided at the location of every possible writing surface.

Some pressure-sensitive writing tools are known in the art. One such tool is described in U.S. Pat. No. 4,896,543. In the device of the '543 patent, a three-axis pressure measurement stylus contains a plurality of pressure-sensitive mylar sheets located adjacent to the tip of the device. However, for the pressure-sensitive writing tool to be accurate and reliable, the pressure measurement should not depend on the indirect measurement of pressure by sensing strain, as with a strain gage, since the modulus and dimensional accuracy of the material used are subject to manufacturing variations and environmental influences. The pen assembly should preferably measure writing pressures directly, without significant compliance between the pen tip and pen housing. Systems depending on spring deflection provide unwanted compliance.

Other writing tools disclosed in the prior art also contain measuring hardware which is coupled to the tip or to the ink shaft of the tip. The device disclosed in U.S. Pat. No. 4,646,351 to Asbo et al. and in U.S. Pat. No. Re 29,765 to Crane et al. each contain a set of strain gages located on a suspended flexible diaphragm which is disposed on the shaft of the stylus. The strain gages measure the flexure of the tip shaft.

In addition, U.S. Pat. No. 4,111,052 shows strain measurement in a bending tube using separate strain gages. The use of separate strain gages requires special additional structures in order to obtain bending parameter inputs. U.S. Pat. No. 4,078,226, on the other hand, shows the measurement of deflection along long PZT beams, wherein the bending of the pen cartridge is measured, rather than the stress in the cartridge itself.

It is useful to note that it is known to use selective metallization of PZT structures to provide selective outputs. See for example U.S. Pat. No. 4,513,437.

What is needed is a stylus suited to detecting applied pressures that is substantially immune to damage from the inadvertent application of excessive pressures and that is capable of accurate measurements of strain without impediments due to the mechanical and environmental characteristics of the carrier structure.

SUMMARY OF THE INVENTION

According to the present invention, a stylus for sensing strain in multiple dimensions comprises a stylus tip assembly that has embedded in the shaft structure at a predetermined distance from the tip, an integral sensing means sensitive to bending moments caused by tactile writing pressures in the shaft and the axial pressure. Specifically, the pressure-sensitive sensors are integrated into and located within a particularly sturdy portion of the structure of the larger shaft body and are not constructed as part of a more fragile tip or tip/shaft assembly. The writing stylus of the present invention provides a more durable writing stylus than writing tools having strain measurement means mechanically coupled to the stylus tip. The resulting stylus is thus more rugged and durable than that of other known devices. The pressure sensitive sensors provide more reliable measurements, since they sense pressure directly and since the pen does not require the high precision manufacturing needed for sensors which measure strain of the pen components.

In one embodiment of the present invention, the hollow shaft that houses the tip is substantially circularly cylindrical in shape. Four pressure-sensitive sensors are built into an annular sensing means imbedded in the shaft and are spaced equally about the hollow shaft. Thus, the pressure sensing is not dependant upon the particular orientation of the stylus in the user's hand and the stylus need not be grasped in a particular orientation in order to yield consistent results.

The invention will be better understood by reference to the following detailed description in connection with the accompanying drawings.

DESCRIPTION OF SPECIFIC EMBODIMENTS

Figure 1:
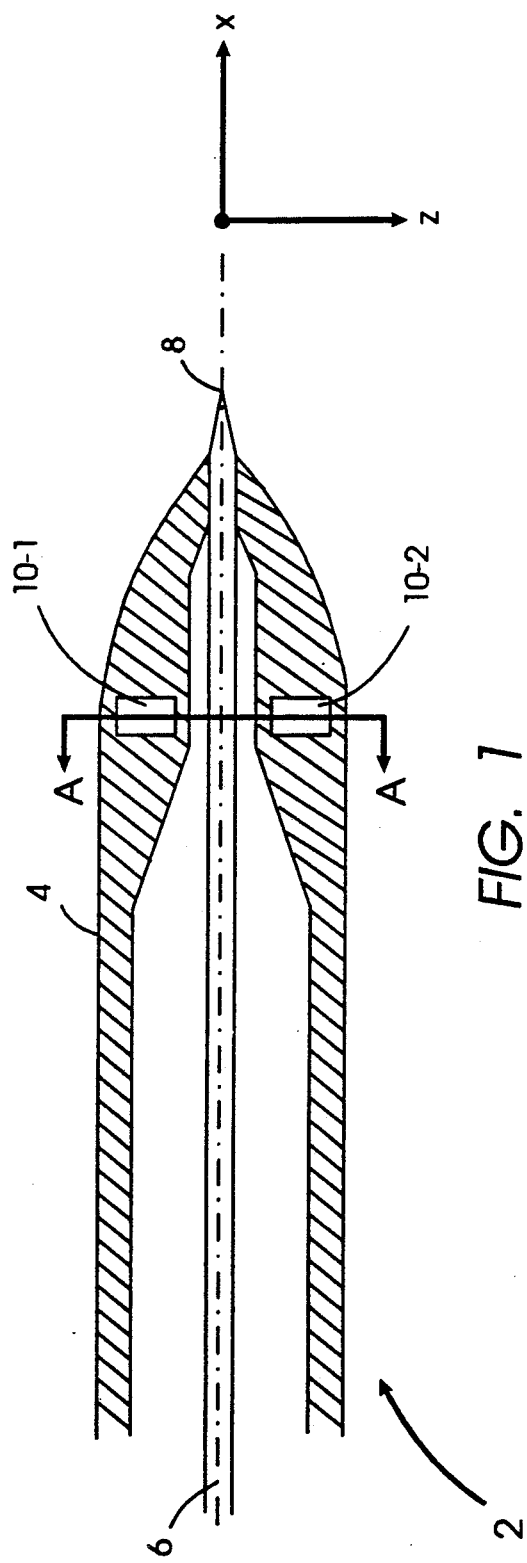
FIG. 1 a cross-sectional view of a writing stylus according to an of the present invention.

In FIG. 1, a cross-sectional view of a writing stylus 2 according to an embodiment of the present invention is illustrated. The stylus 2 is formed of a hollow shaft 4, through which passes a tip shaft 6. A tip 8 protrudes from hollow shaft 4 at the extreme end of tip shaft 6. Tip shaft 6 may be filled with ink, such as a ballpoint pen cartridge.

Disposed within the structure of the hollow shaft 4 at a predetermined distance from tip 8 is pressure-sensitive sensor means 10. Pressure-sensitive sensor means 10 may be an annularly-shaped PZT sensor module constructed with, for example, four quadrants of sensors, with each of four sensors coupled separately to provide electric signals in response to strain applied locally to each module by pressures within the adjacent shaft body. Importantly, the sensor means 10 is integral to the shaft 4 and physically a member of the beam structure. The four quadrants are coupled to electronic processing circuitry (not shown). Optionally, other pressure-sensing devices, well-known to those of skill in the art, which can be imbedded in the shank portion of the shaft 4 adjacent the cone portion, may be used.

Figure 2:
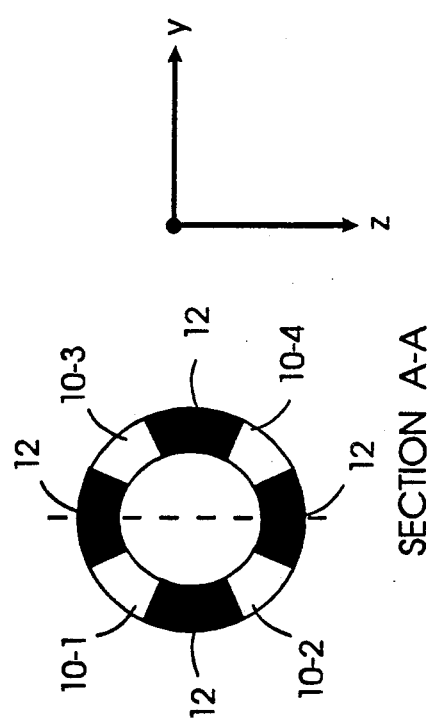
FIG. 2 is a cross-sectional view of a writing stylus in plane A—A of FIG. 1 showing orientation of pressure-sensitive sensors according to an embodiment of the present invention.

FIG. 2 shows a cross sectional view of stylus 2 taken at section A—A. This sectional view reveals that sensor means 10 may be constructed of a singular annulus which is metallized on one side of the PTZ annulus in regions 12 at quadrants around the shaft 4 to provide electrodes across which signals may be detected in accordance with the piezo-electric effect. On the opposing face of the PZT annulus is a ground metallization. The masking may be accomplished using conventional metallization deposition techniques prior to imbedding the sensor means 10 in the shaft 4. Metallization regions 12 subdivide sensor 10 into four quadrants and thus provide four regions of sensor separation 10-1 through 10-4 about the stylus shaft 4. Signals are extracted only from the regions 12, and primarily parallel to the axis of the shaft. The sensor means 10 is integral with the structure of the shaft 4 and surrounded on all sides with cylindrical structure of the hollow shaft 4. Preferably, the sensor means 10 are positioned between the tip 8 and the place the user grips the shaft 4.

The location of one sensor per quadrant enables pressures to be detected by differential sensing. The pressures within the shaft on each of the sensors 10 can be sorted out to determine the orthogonal components in each of the three axes shown in FIGS. 1 and 2. Processing means associated with the electronic processing module may decipher the four signals. Furthermore, if the shaft is cylindrical, or substantially cylindrical, the particular orientation with which the user grasps stylus 2 will be immaterial. Verification of the signature can be achieved by rotating (mathematically) the observed measurements so that they may be compared with the reference measurements.

The process of housing sensor means 10 in hollow shaft 4, for example by bonding or brazing, removes the sensor means 10 from any direct mechanical connection to the more fragile tip and tip shaft structures. In addition, the tip shaft 8 of the present invention is less costly than devices having the sensor coupled to the tip shaft because the tip shaft need not be made larger to support this structure and is inherently less complex.

The writing pressure is measured by directly measuring bending stress in the hollow shaft 4. Stress is not measured by sensing strain, so the physical properties, variation and environmental sensitivity of shaft 4 have no direct effect on the accuracy of writing pressure measurement.

The solid coupling of the pen cartridge 6 and the hollow shaft 4 provides a stable and rigid pen, with no deflection or compliance experienced by the pen tip 8 during writing.

The location of sensor means 10 also physically distances the signal pickup portion from the tip itself, which bears the pressure of the writing act on a very small surface. Thus the sensor means 10 bears a distributed load imparted by the user in moving the stylus and does not directly bear the load of the stylus and the act of writing, as would be encountered if sensors 10 were placed at or near tip 8. The stylus of the present invention is therefore a more rugged and durable device than a stylus in which the pressure sensor is integral with the tip.

In operation, a user grasps stylus 2 to apply pressure to tip 8 to write a signature or phrase. Pressure-sensitive sensors 10 detect the pressure variations imposed on shaft 4 when the user puts stylus 2 in contact with the writing surface to pressure the stylus to move in the pattern necessary to form the signature or phrase. Suitable signal processing can be used to compare the pressure pattern generated with the pressure pattern of the reference signature or phrase to determine authenticity.

The invention has now been explained with reference to specific embodiments. Variations and modifications will be readily apparent to those of ordinary skill in the art. For example, three, five or even more sensor portions may be employed without departing from the scope and spirit of the invention. Therefore, the invention should be construed in light of the claims.

What is claimed is:

1. A stylus for generating signals in response to tactile pressure comprising:
   a shaft having a tip;
   at least a first pressure-sensitive sensor embedded in said shaft at a first location at a first displacement from said tip;
   at least a second pressure-sensitive sensor embedded in said shaft at a second location at said first displacement from said tip; and
   at least a third pressure-sensitive sensor embedded in said shaft at a third location at said first displacement from said tip.

2. The stylus according to claim 1 further including a fourth pressure-sensitive sensor embedded in said shaft at a fourth location at said first displacement from said tip, said first, second, third and fourth sensors being disposed in an annulus about said shaft at a preselected distance from said tip.

3. The stylus according to claim 1 wherein said pressure-sensitive sensors are disposed at a position adjacent a junction of a barrel portion and a cone portion of the shaft in order to sense pressure in the shaft as between gripping fingers and the tip in contact with a writing surface, at a preselected distance from said tip.

4. The stylus according to claim 2 wherein said first pressure-sensitive sensor and said third pressure-sensitive sensor are disposed opposing one another across said shaft.

5. The stylus according to claim 4 wherein said second pressure-sensitive sensor and said fourth pressure-sensitive sensor are disposed opposing one another across said shaft.

6. The stylus according to claim 5 wherein said first pressure-sensitive sensor and said third pressure-sensitive sensor are disposed along a first axis and said second pressure-sensitive sensor and said fourth pressure-sensitive sensor are disposed along a second axis, said first axis being orthogonal to said second axis, and said first and second axis being orthogonal to a central axis of said shaft.

7. The stylus according to claim 6 wherein said first pressure-sensitive sensor and said third pressure-sensitive sensor are sensitive only to pressures along said first axis and wherein said second pressure-sensitive sensor and said fourth pressure-sensitive sensor are sensitive only to pressures along said second axis.

8. The stylus according to claim 1 wherein said shaft is substantially circularly cylindrical.

* * * * *

UNITED STATES PATENT AND TRADEMARK OFFICE
CERTIFICATE OF CORRECTION

PATENT NO. : 5,111,004

DATED : May 5, 1992

INVENTOR(S) : Larry S. Gullman

It is certified that error appears in the above-identified patent and that said Letters Patent is hereby corrected as shown below:

In Col. 2, line 38, after the word "an", kindly insert the word --embodiment--.

Signed and Sealed this

Seventh Day of September, 1993

Attest:

BRUCE LEHMAN

*Attesting Officer*     *Commissioner of Patents and Trademarks*